UNITED STATES PATENT OFFICE.

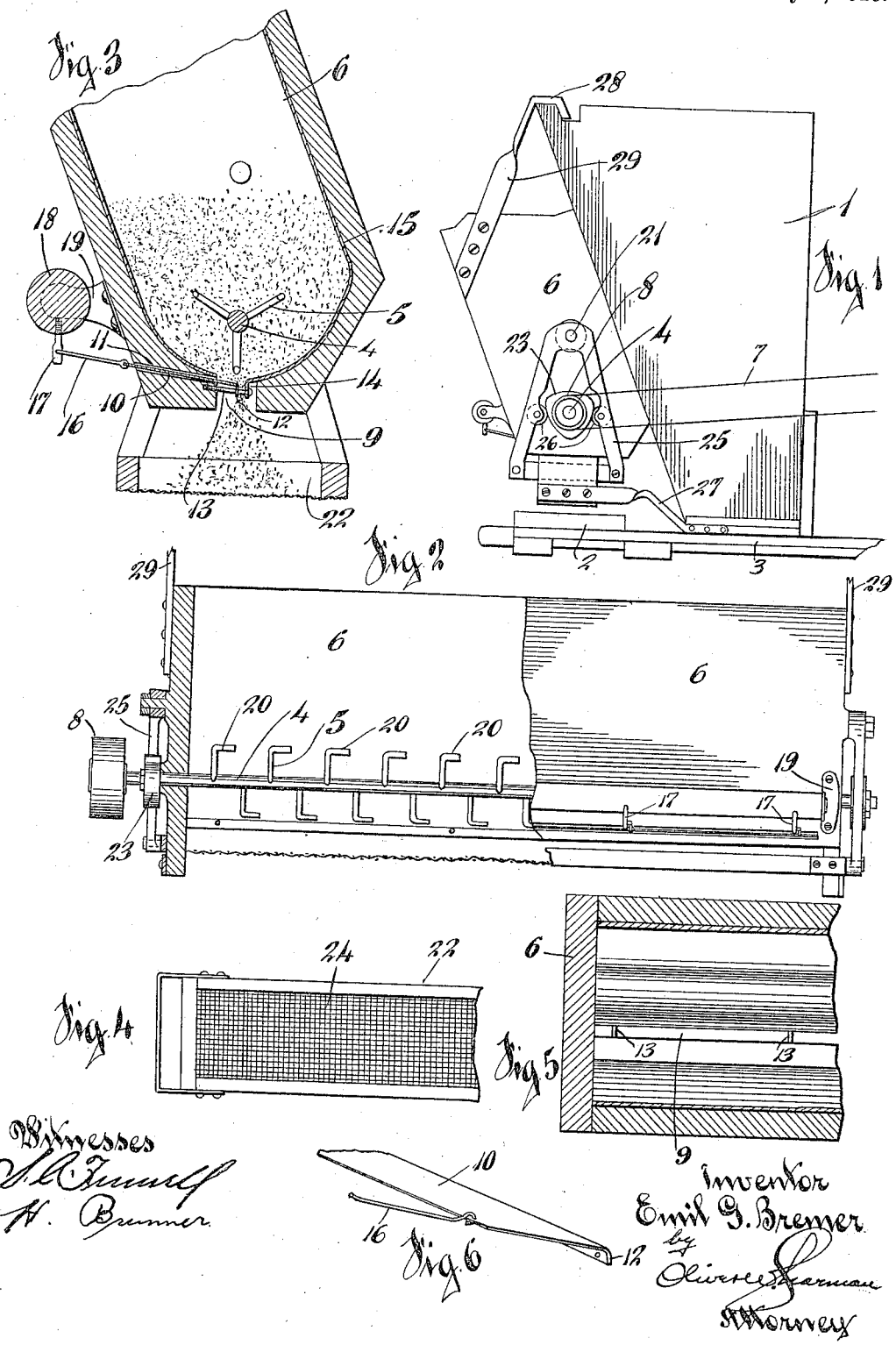
E. G. BREMER.
CANDY STARCHING DEVICE.
APPLICATION FILED APR. 14, 1914.
1,181,208.
Patented May 2, 1916.

EMIL G. BREMER, OF CINCINNATI, OHIO.

CANDY-STARCHING DEVICE.

1,181,208. Specification of Letters Patent. Patented May 2, 1916.

Application filed April 14, 1914. Serial No. 831,842.

*To all whom it may concern:*

Be it known that I, EMIL G. BREMER, a citizen of the United States, residing at Cincinnati, in the county of Hamilton and State of Ohio, have invented certain new and useful Improvements in Candy-Starching Devices, of which the following is a specification.

My invention relates to candy starching devices and particularly to automatic starchers adapted to be attached to the depositor of a candy machine and driven thereby.

The object of my invention is to provide a candy starcher which will starch the candy after it has been deposited in the casts and ready to set, automatically and besides more uniformly than it can be done by hand.

Another object of my invention is to produce a candy starcher automatically operated, which is simple in construction, economical to manufacture, and one which will accomplish the starching of the candy without wasting the starch and still spread the starch more uniformly over the entire cast of candy.

My invention consists in providing a hopper to carry a proper supply of starch which can be hung or supported on the depositor of the casting machine and providing same with a rotating agitator near the outlet thereof, then placing a swinging wire mesh sifter under the hopper and in which the starch is deposited, said swinging sifter being operated by means of a suitable cam or engaging connection with said shaft of the agitator, the said shaft of the agitator being driven from the main shaft or driving mechanism of the casting machine, and means for adjusting and regulating the output of starch from the starch hopper.

In the accompanying sheet of drawings which serve to illustrate my invention and which show a preferred construction, Figure 1 is a side elevation of my device shown mounted on the depositor of the casting machine. Fig. 2 is a front elevation view partly in section. Fig. 3 is a cross section taken through the lower portion of my device and showing the regulating mechanism. Fig. 4 is a separate detail view of the screen or sifter employed in my invention. Fig. 5 is a fragment of a longitudinal section taken through the hopper of my device showing the opening through which the starch is deposited. Fig. 6 is a detail perspective of a portion of the regulating slide or gate employed to regulate the flow of starch through the outlet opening of the hopper.

Referring to the drawings more in detail, 1 illustrates the depositor of a casting machine for casting candy, and 2 represents a cast which will be presumed to have passed under the depositor on the tracks 3 and to have been filled with the proper amount of candy. Now to prevent the candy from sticking together, due as a rule to dampness, it is necessary to sprinkle or spread starch over the candy which counteracts the tendency of the candy to stick.

The depositor is operated by means of pumps which is a well known operation and which it is not considered necessary to describe or illustrate in this application, but, however, the shaft 4 carrying the agitators 5 of the hopper 6, is driven by the said mechanism by means of a belt 7 or otherwise, connected to the pulley 8.

The hopper 6 is preferably lined with a sheet metal material to prevent as much as possible the starch from adhering to the sides of the hopper, and becoming lumpy. The mouth or outlet 9 is provided in the bottom of the hopper and is adjusted by means of the sliding gate or plate 10 which operates in a suitable slot 11 in the side of the hopper. This slide or gate 10 has a flange or turned down portion 12 at the inner edge which has suitable holes therein through which rods 13 pass. The slide 10 operates on these rods or pins which pins are fastened to a turned down flange 14 on the lining 15 on the opposite side from the slide 10 and which are also fastened preferably in the side or bottom of the hopper. The slide 10 is preferably provided with extending arms 16 at the outer side or edge thereof which extensions are fastened to crank arms 17 on a handle shaft 18 mounted in brackets 19 on the hopper. Thus as the handle is rotated the slide 10 is drawn away from or drawn to the flange 14, whichever is desired, to regulate the opening 9.

An agitator 5 having a series of projecting contact fingers or stirring members thereon, is provided and consists of the shaft 4 having the said stirring fingers 20 thereon inside of the hopper. The shaft 4 has its bearings in the sides of the hopper 6 and has the pulley 8 mounted thereon at its outer end. Adjacent the pulley I provide a cam or eccentric 23 which rotates with the shaft 4 and is tightly mounted thereon, and I also provide one of these cams at the other end of the shaft 4. Mounted by means of the pivot 21 on the outside of the hopper and at each end thereof I provide swinging brackets 25 which straddle the cams 23 and carry a sifter 22 at their lower ends. This sifter may be constructed in any suitable manner preferably having a wire mesh screen 24 at the bottom thereof to allow the starch to sift therethrough. The swinging brackets 25 have engaging rollers 26 mounted thereon which are adapted to be engaged by the cams 23 as they are being rotated, thereby imparting a swinging motion to the brackets 25 and thereby shaking the starch through the screen or sifter 22.

In sifting starch a swinging motion is not sufficient in itself to properly shake the starch because starch adheres readily and must be shaken vigorously before it will reach its proper powdered state for shaking on the candy. For this reason the cam must be so shaped as to allow the brackets 25 to be rocked vigorously preferably with a bump at the limit of each stroke, thereby agitating the starch and causing the starch to fall more rapidly.

The hopper is supported or hung from the depositor of the machine for casting the candy by means of the arms 29 at the top of the hopper and by means of corresponding arms 27 at the bottom thereof. The arms 29 are provided with hook portions 28 and hook over the top of the depositor 1, while the arms 27 are fastened to the depositor at the bottom in any suitable manner.

The operation of the depositor is well known and the casts 2 are constantly being carried under same after which the starch is sprinkled over the casts of candy. It is believed that the sprinkling of the starch done in this manner, that is automatically, will better cover the candy and save a great deal of time and labor as well as expense, inasmuch as the device will not waste any starch, which is so often the case when it is done by hand.

Certain modifications of my invention may be made without departing from its spirit and scope and I do not wish to be confined to the exact details shown.

What I claim as new and desire to secure by Letters Patent is:

1. The combination in a machine for starching candy, of a hopper, a rotatable agitator shaft in said hopper, disks rotatable with said shaft, said disks having irregular peripheries, swinging brackets on said hopper adapted to straddle said disks and be engaged by the periphery of said disks when the agitator shaft is rotated, a sifting screen mounted on said brackets and under said hopper and a plurality of rollers on said brackets at the points of contact with said disks, whereby the said screen is jarred and swung.

2. The combination in a machine for starching candy, of a hopper having an outlet opening, a sifting screen under said hopper, brackets mounted on said hopper and attached to said screen, an agitator shaft in said hopper, disks thereon, said disks having an irregular periphery, said brackets so constructed as to be engaged by the irregular periphery of said disks, whereby said screen is swung on said brackets when the agitator shaft is rotated and jarred by the irregular surfaces of said disks contacting with said brackets.

3. The combination in a machine for sifting powdered material, of a hopper, a rotatable agitator shaft in said hopper, swinging brackets on said hopper, a sifting screen mounted on said brackets, disks having a plurality of contact points thereon, and mounted on said shaft in a position to engage said brackets to swing and jar same, and means for regulating the discharge of the contents of said hopper into said sifting screen.

4. The combination in a machine for sifting powdered material, a hopper, a sifting screen, a rotating shaft in said hopper, agitators on said shaft, swinging brackets on said hopper, disks on said shaft and rotatable therewith, having a plurality of contacting points thereon for engaging said brackets whereby said screen is swung and jarred with the rotation of said shaft, with means for regulating the discharge of the contents of said hopper into said screen.

5. The combination in a machine for sifting fine material, a hopper, swinging brackets on said hopper, a sifting screen on said brackets, a shaft, an agitator on said shaft, disks on the ends of said shaft having a plurality of contact points, rollers on said brackets for engagement with said contact points on said disks, with means for regulating the discharge of the contents of the hopper into said screen.

6. The combination in a machine for starching candy, a hopper having a longitudinal outlet opening at the bottom thereof, means for regulating the size of said opening, a sifting screen under said hopper, brackets mounted on each end of said screen adapted to carry the entire screen therewith, said brackets pivoted to the sides of said hopper and adapted to straddle a rotatable disk having an irregular surface, rollers on said bracket adapted to be engaged by the irregular surface on said disk when it is
5 rotated, an agitator in said hopper, said disk rotatable therewith, whereby said screen is swung and jarred with the said brackets for sifting and shaking the contents of said hopper therethrough.

EMIL G. BREMER.

Witnesses:
GEORGE S. BAILY,
OLIVER W. SHARMAN.

Copies of this patent may be obtained for five cents each, by addressing the "Commissioner of Patents, Washington, D. C."